(12) United States Patent
Matignon (10) Patent No.: US 9,737,937 B2
(45) Date of Patent: Aug. 22, 2017

(54) TOOL SUPPORT INCORPORATING A GUIDANCE SYSTEM SPACED APART FROM THE TOOL AND MACHINING DEVICE INCORPORATING THE TOOL SUPPORT

(71) Applicant: Airbus (S.A.S.), Blagnac (FR)

(72) Inventor: Mickaël Matignon, Aussonne (FR)

(73) Assignee: AIRBUS (S.A.S.), Blagnac (FR)

( * ) Notice: Subject to any disclaimer, the term of this patent is extended or adjusted under 35 U.S.C. 154(b) by 359 days.

(21) Appl. No.: 14/471,370

(22) Filed: Aug. 28, 2014

(65) Prior Publication Data

US 2015/0063934 A1 Mar. 5, 2015

(30) Foreign Application Priority Data

Sep. 4, 2013 (FR) ...................................... 13 58444

(51) Int. Cl.
*B23Q 35/10* (2006.01)
*B23B 39/26* (2006.01)
(Continued)

(52) U.S. Cl.
CPC .............. *B23B 39/14* (2013.01); *B23B 39/26* (2013.01); *B23B 45/003* (2013.01); *B23B 47/28* (2013.01);
(Continued)

(58) Field of Classification Search
CPC . Y10T 409/301232; Y10T 409/301456; Y10T 409/30252; Y10T 409/3014;
(Continued)

(56) References Cited

U.S. PATENT DOCUMENTS 1,899,775 A 2/1933 Schnable
2,487,143 A * 11/1949 Kern ...................... A61C 13/00
409/84

(Continued)

FOREIGN PATENT DOCUMENTS

EP 1978889 10/2008
FR 1 604 796 A 1/1972
WO WO 2007/143766 A2 12/2007

OTHER PUBLICATIONS

Merriam-Webster's Collegiate Dictionary, Tenth ed., copyright 1998, dictionary definition of "secant" with "CIRCLE" illustration, p. 1054 and the bottom portion of p. 207.*
Machine Translation FR 1604796 A, which FR '796 was published Jan. 31, 1972.*
Preliminary Search Report for Application No. 1358444 dated Mar. 11, 2014.

*Primary Examiner* — Erica E Cadugan
(74) *Attorney, Agent, or Firm* — Jenkins, Wilson, Taylor & Hunt, P.A.

(57) ABSTRACT

A tool support is disclosed including a fixed part, a moving part that is movable relative to the fixed part, a first crossmember linked to the moving part and a second crossmember. A tool includes a tool axis linked to the first and second crossmembers by pivoting links including articulation axes. A pointer is provided with a pointer axis parallel to the tool axis, the pointer being linked to the first and second crossmembers by pivoting links including articulation axes, with the articulation axes being parallel to one another. The tool support includes an immobilizer of occupy a first immobilized state in which it prevents a rotational movement on at least one articulation axis and a second released state in which it allows rotational movement on the articulation axes.

23 Claims, 7 Drawing Sheets

(51) Int. Cl.
*B23B 39/14* (2006.01)
*B23B 45/00* (2006.01)
*B23B 47/28* (2006.01)
*B23B 49/02* (2006.01)
*B24B 17/02* (2006.01)
*B23Q 1/54* (2006.01)
*B23Q 3/04* (2006.01)
*B44B 3/00* (2006.01)

(52) U.S. Cl.
CPC ............ B23B 49/02 (2013.01); B23Q 1/5462 (2013.01); B23Q 3/04 (2013.01); B23Q 35/10 (2013.01); B24B 17/021 (2013.01); *B23B 2270/34* (2013.01); *B23Q 2735/004* (2013.01); *B23Q 2735/045* (2013.01); *B44B 3/002* (2013.01); *Y10T 408/567* (2015.01); *Y10T 409/30252* (2015.01); *Y10T 409/301232* (2015.01); *Y10T 409/301456* (2015.01)

(58) Field of Classification Search
CPC . Y10T 29/5105–29/5108; B44B 3/002; B23C 1/16; B23Q 35/10; B23Q 2735/002; B23Q 2735/004; B23Q 2735/04; B23Q 2735/045; B23B 39/26
USPC .............. 409/86, 90, 109, 89; 33/25.2, 25.1; 29/26 R–26 B
See application file for complete search history.

(56) References Cited

U.S. PATENT DOCUMENTS

| | | | | |
|---|---|---|---|---|
| 3,100,344 | A | * | 8/1963 | Sharp .................... A61C 1/082 33/23.01 |
| 3,211,061 | A | * | 10/1965 | Cretsinger ......... B23D 57/0076 144/144.1 |
| 3,555,690 | A | * | 1/1971 | Matthey ............. B23Q 17/2233 33/25.3 |
| 4,403,961 | A | * | 9/1983 | Gurney ................ A61C 19/055 433/213 |
| 4,863,318 | A | | 9/1989 | Pearl |
| 7,131,470 | B1 | * | 11/2006 | Sommers ............. B25H 1/0021 144/135.2 |

* cited by examiner

TOOL SUPPORT INCORPORATING A GUIDANCE SYSTEM SPACED APART FROM THE TOOL AND MACHINING DEVICE INCORPORATING THE TOOL SUPPORT

CROSS-REFERENCE TO RELATED APPLICATION

This application claims priority to French Patent Application No. 13 58444 filed on Sep. 4, 2013, the entire content of which is incorporated by reference herein.

TECHNICAL FIELD

The present disclosure relates to a tool support incorporating a guidance system spaced apart from the tool and a machining device incorporating the tool support.

BACKGROUND

When drilling using a drill bit, it is possible to use a drill bush to guide the drill bit. In this case, the axis of the drill bush is merged with the axis of the hole to be produced.

When it is necessary to produce a number of drill holes in one and the same area of a part, it is possible to use a drilling template in the form of a plate provided with a number of holes positioned relative to one another in accordance with the positions of the holes to be produced in the part. This drilling template is placed between the part to be drilled and the tool and is positioned relative to the part in such a way that the axes of the holes of the template are merged with the axes of the holes to be produced. The holes of the template make it possible not only to position the end of the tool relative to the front surface, but also to position the tool according to a determined angle of attack relative to the front surface.

Hereinafter in the description, "front surface" will be understood to mean the surface via which a tool penetrates to perform a machining operation.

Depending on the applications, the holes of the drilling template may be each equipped with a drill bush in order to reduce their wear.

According to one procedure, the operator positions the drilling template relative to the part. Then, he or she can produce the holes by positioning, for each of them, the tool relative to the corresponding template hole. Ideally, for each hole to be produced, the viewing axis of the operator should form a small angle with the axis of the hole of the template corresponding to the hole to be produced for positioning the tool.

In the aeronautical field, drilling templates can be used when manufacturing and assembling parts.

In certain circumstances, it is necessary to work in the aircraft to produce holes, for example for maintenance operations. To execute drill holes, the operator can use a hand-held tool, such as a portable drill. This drill comprises a body (possibly with a handle) and a head linked to the body supporting a cutting tool such as a drill bit for example. Advantageously, the head comprises suction for sucking the chips generated in the machining and discharging them via a discharge duct.

To produce a hole, the operator positions the end of the drill bit on the axis of the hole to be produced, then exerts a force to generate a movement to advance the drill bit which, when combined with the rotation of the drill bit, generates the machining.

As indicated previously, in order to correctly position the tool relative to the hole to be produced, the viewing axis of the operator should form a small angle with the axis of the hole to be produced. Moreover, during the drilling operation, the operator should be correctly positioned relative to the hole to be produced so as to exert a force in the direction of the axis of the hole to be produced in order for the hole to be correctly produced in accordance with the geometrical and dimensional tolerances.

Certain areas of the aircraft, such as, for example, the join between the fuselage and the wings, are areas that are difficult to access and confined. In certain cases, the operator cannot be correctly positioned to the drill holes to be produced so that his or her viewing axis is not optimally positioned to facilitate the positioning of the tool relative to the drill holes to be produced. Furthermore, when not correctly positioned, it is difficult for the operator to exert a force on the tool that is always correctly oriented relative to the axis of the drill hole to be produced.

The operator could consider positioning a drilling template with holes that are aligned with the drill holes to be produced. However, even in this case, it would be difficult for the operator not correctly positioned relative to the drill hole to be produced to position the tool relative to the holes of the drilling template and exert a force on the tool that is always correctly oriented relative to the axis of the drill hole to be produced.

Consequently, the drilling operations in confined areas of the aircraft are lengthy and difficult to carry out.

According to another issue, the operator may be required to perform, in these confined areas of the aircraft, more complex machining operations than holes. These complex machining operations are, like those for the drill holes, lengthy and difficult to perform.

To perform complex machining operations, there are copying techniques that use a pantograph. A device making it possible to implement such a technique is described in the document EP-1.978.889 and comprises a pantograph in the form of a deformable parallelogram with four sides hinged in pairs, along mutually parallel articulation axes. A first side of this pantograph is securely attached to a moving carriage which can be moved in a plane. The pantograph supports a pointer securely attached to a second side that is articulated relative to the first side and a tool securely attached to a third side parallel to the second side and articulated relative to the first side, the pointer and the tool being spaced apart from the first side. The tool has a rotation axis parallel to the articulation axes and parallel to the plane of movement of the carriage. This architecture does not make it possible to produce drill holes.

Consequently, there is no multipurpose machining device that makes it possible to perform drilling and machining operations by copying with a guidance system spaced apart from the tool.

SUMMARY

Thus, the present disclosure aims to remedy the drawbacks of the prior art.

To this end, the subject of the disclosure is a tool support comprising:
 a fixed part,
 a moving part that moves relative to the fixed part,
 a first crossmember linked to the moving part and a second crossmember, a tool with a tool axis, the tool being linked to the first and second crossmembers by pivoting links comprising articulation axes, a pointer a pointer axis parallel to the tool axis, the pointer being linked to the first and second crossmembers by pivoting links comprising articulation axes, the articulation axes being parallel to one another.

According to one feature of the disclosure, the tool support comprises immobilizer capable of occupying a first immobilized state in which it prevents a rotational movement on at least one articulation axis and a second released state in which it allows rotational movement on the articulation axes.

This configuration makes it possible to obtain a multipurpose tool support which can perform drilling and machining operations by copying.

Preferably, the tool support comprises a link linking the moving part to the fixed part which allows at least one translational movement in a direction T1 at right angles to the articulation axes.

According to another feature, the link linking the moving part to the fixed part allows at least one movement in a plane at right angles to the first direction T1.

According to one embodiment, the link linking the moving part to the fixed part comprises three slide links respectively allowing translational movements in three directions T1, T2, T3 at right angles to one another.

Advantageously, the tool support comprises a lock for immobilizing the moving part relative to the fixed part in at least one direction.

According to another feature, the support comprises a link between the first crossmember and the moving part which allows a rotational movement between the first crossmember and the moving part.

Advantageously, the tool support comprises a lock for immobilizing the rotation of the first crossmember relative to the moving part.

According to another feature, at least one link of the tool support allowing a degree of freedom comprises a dampener for absorbing or damping shocks or vibrations.

To obtain a robust tool support, the tool axis is secant, and preferably at right angles, with the articulation axes linking the tool and the first and second crossmembers. Advantageously, the pointer axis is secant, and preferably at right angles, with the articulation axes linking the pointer and the first and second crossmembers.

According to another feature, the first crossmember is linked to the moving part in such a way as to extend on either side of the moving part.

The disclosure also proposes a machining device comprising a tool support.

According to one feature, the machining device comprises a stencil with a form making it possible to perform a machining in a part by copying.

Advantageously, the machining device comprises a soleplate onto which the tool support is removably fastened.

BRIEF DESCRIPTION OF THE DRAWINGS

Other features and advantages will emerge from the following description of the disclosure, a description given purely as an example, in light of the appended drawings in which.

Figure 1:
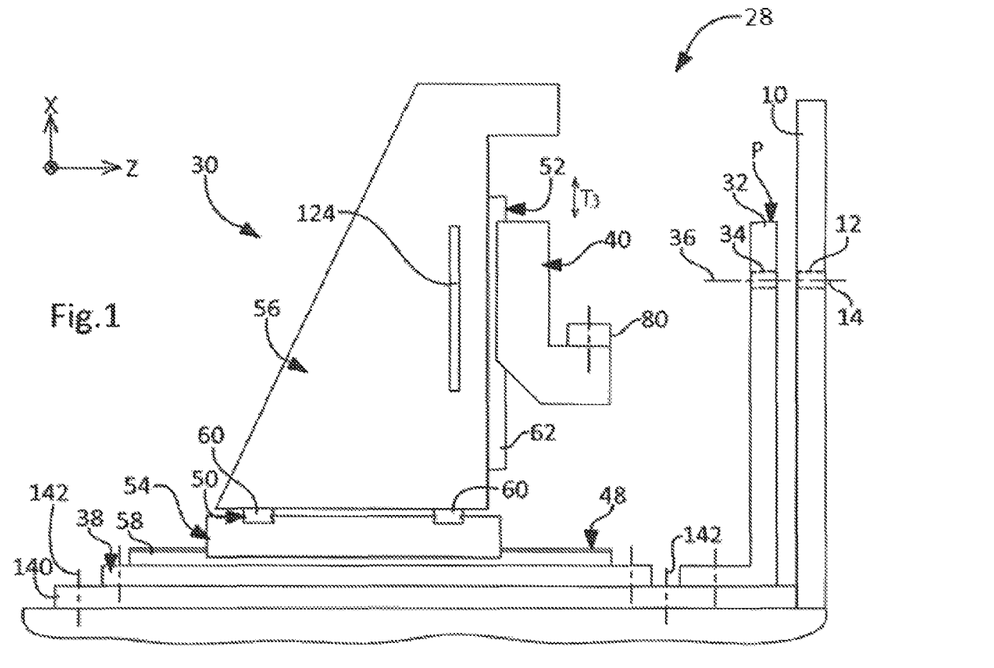
FIG. 1 is a side view of a schematic representation of a machining device without tool and without pointer which illustrates a simplified variant of the disclosure.
Figure 3:
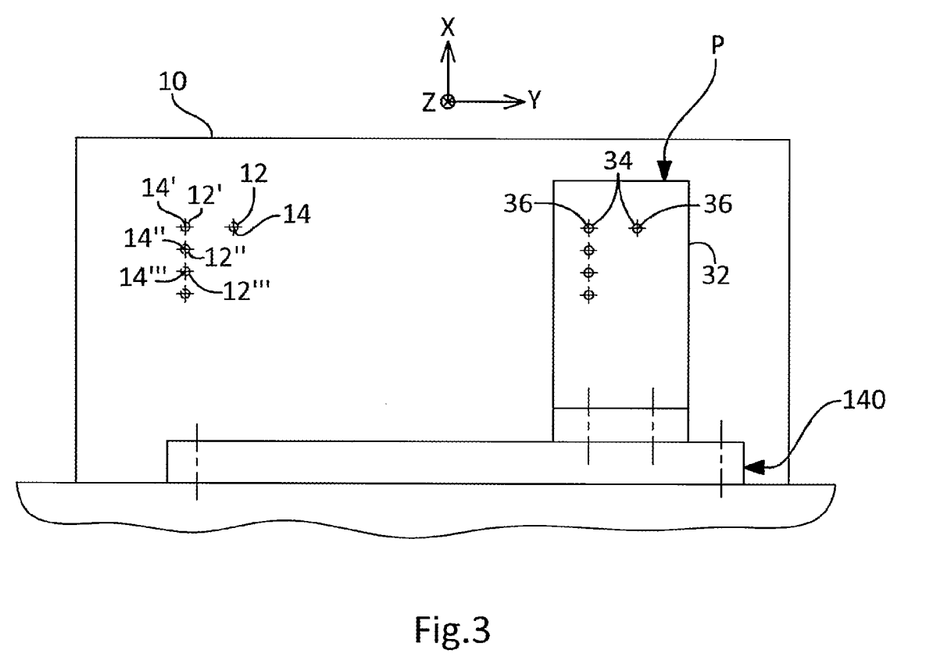
FIG. 3 is a front view illustrating holes to be produced in a part as well as a part of the machining device.
Figure 4:
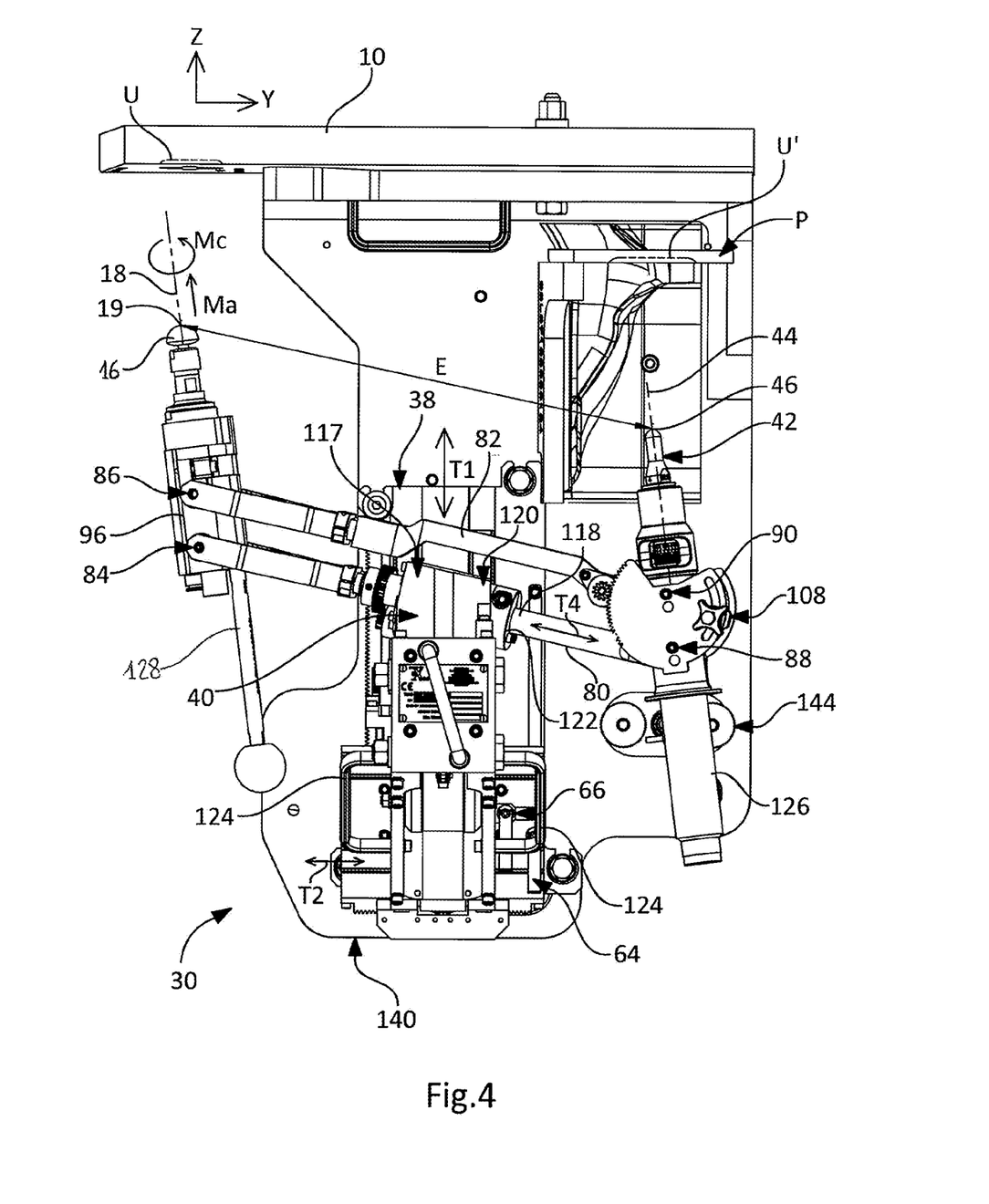
FIG. 4 is a plan view of a machining device which illustrates an embodiment of the disclosure.

FIGS. 1, 3 and 4 show a part 10 in which at least one machining U, such as a blind or through hole 12 for example, should be performed.

A "part" should be understood to mean a part or a set of parts assembled or currently being assembled. According to one application, the part 10 is a wall of an aircraft such as, for example, a wall provided in the area of join between the fuselage and the wings.

FIG. 3 shows, in dotted lines, a number of holes 12, 12', 12", 12''' to be produced.

Each hole 12, 12', 12", 12''' comprises a hole axis 14, 14', 14", 14'''. The holes 12, 12', 12", 12''' are positioned and oriented in an orthonormal reference frame XYZ linked to the part 10.

This orthonormal reference frame XYZ comprises:

a first axis Z or depth, this axis Z corresponding to an axis substantially merged with the normal of the front surface of the part 10, a second axis X at right angles to the first axis Z which corresponds to a vertical movement, oriented towards the top of the sheet in FIG. 3, a third axis Y at right angles to the axis Z and to the axis X which corresponds to a lateral movement, oriented towards the right of the sheet in FIG. 3.

FIG. 4 shows a machining U to be produced in the part 10. As an example, the machining U takes the form of a cross. Other, more or less complex forms may be envisaged. This machining U is positioned relative to the reference frame XYZ linked to the part 10. The geometry of the machining U is also defined in the reference frame XYZ.

Figure 10:
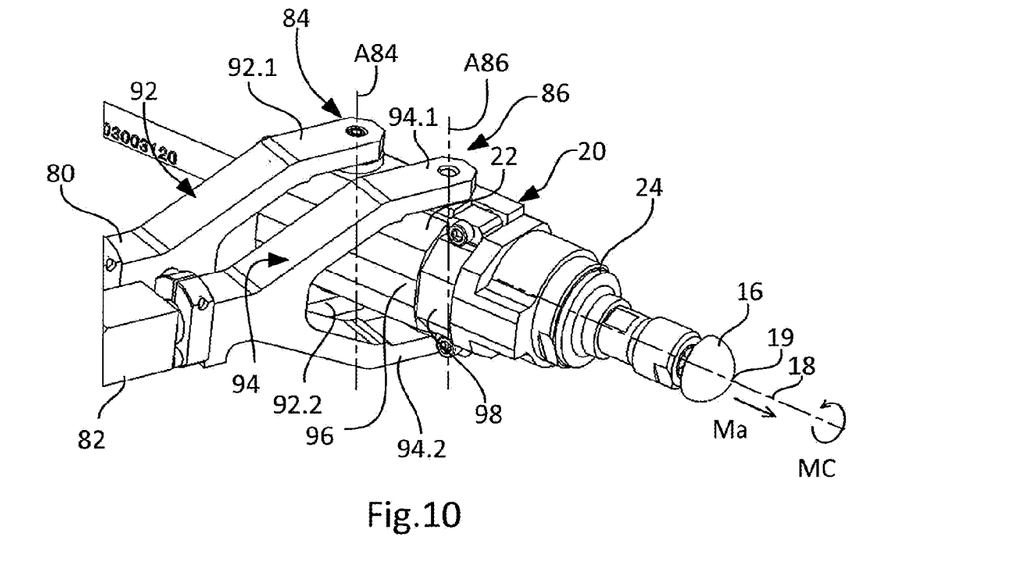
FIG. 10 is a perspective view illustrating a tool in detail.

To produce a hole a tool 16 is used, such as a drill bit for example, which has a cylindrical form with a tool axis 18 and an end 19, as illustrated in detail in FIG. 10.

More generally, to perform a machining operation, a tool 16 is used which has a cutting movement Mc and an advance movement Ma. In FIG. 10, the tool 16 takes the form of a spherical milling tool with an end 19. Its cutting movement Mc corresponds to a rotational movement on an axis of rotation which corresponds to the tool axis 18. The advance movement Ma may be complex and comprises at least one translational movement and/or at least one rotational movement.

In a known manner, as illustrated in FIG. 10, the tool 16 is mounted on an apparatus 20 which comprises a body 22 and a head 24 supporting the tool 16. Advantageously, the apparatus 20 comprises a discharge for discharging waste, chips or other products from the machining. The apparatus 20 provides at least the cutting movement Mc. In the case of a drill bit, the cutting movement Mc is a rotational movement on the tool axis 18.

According to one embodiment, the body 22 is substantially cylindrical. Advantageously, the apparatus 20 is a pneumatic apparatus. To simplify the figures, the elements handling the management of the pneumatic energy are not represented.

The tool 16 and the apparatus 20 are not described further because they can be identical to those of the prior art.

As illustrated in FIGS. 1, 2, 4 and 5, a machining device 28 comprises a tool support 30 and a stencil P.

In the case of drill holes to be produced, as illustrated in FIG. 3, the stencil P can take the form of a drilling template 32 comprising at least one guiding hole 34 with a guiding axis 36.

In the case of at least one machining operation to be performed in the part 10, as illustrated in FIG. 4, the stencil P comprises a U' form such that each point of the form U' of the stencil P has a corresponding point of the machining U of the part. The form U' can be identical to the machining U. As a variant, the form U' may be a scaled version of the machining U. Thus, the form U' of the stencil P makes it possible, by copying, to perform the machining U in the part 10.

The tool support 30 comprises a fixed part 38 and at least one moving part 40 that moves relative to the fixed part 38 and a pointer 42 securely attached to the moving part 40.

According to an embodiment illustrated in FIGS. 2 and 7 to 9, the pointer 42 has a pointer axis 44 and an end 46. To produce at least one drill hole, the pointer 42 has a cylindrical form with a diameter substantially equal, allowing for the play, to the diameter of the guiding hole 34. This play should be such that it enables the pointer axis 44 to be substantially merged with the guiding axis 36. Obviously, the disclosure is not limited to this embodiment.

According to an important point of the disclosure, the tool 16 is securely attached to the moving part 40 in such a way that the tool axis 18 is parallel relative to the pointer axis 44 and the tool axis 18 and the pointer axis 44 are spaced apart. The spacing between the end 19 of the tool 16 and the end 46 of the pointer is denoted E.

According to an embodiment that is common to the variants illustrated in FIGS. 1 to 6, the link between the fixed part 38 and the moving part 40 comprises three slide links 48, 50, 52 respectively allowing translational movements in directions T1, T2, T3 at right angles to one another. According to an embodiment, the direction T3 corresponds to the vertical direction, and the two directions T1 and T2 are in a horizontal plane.

Figure 5:
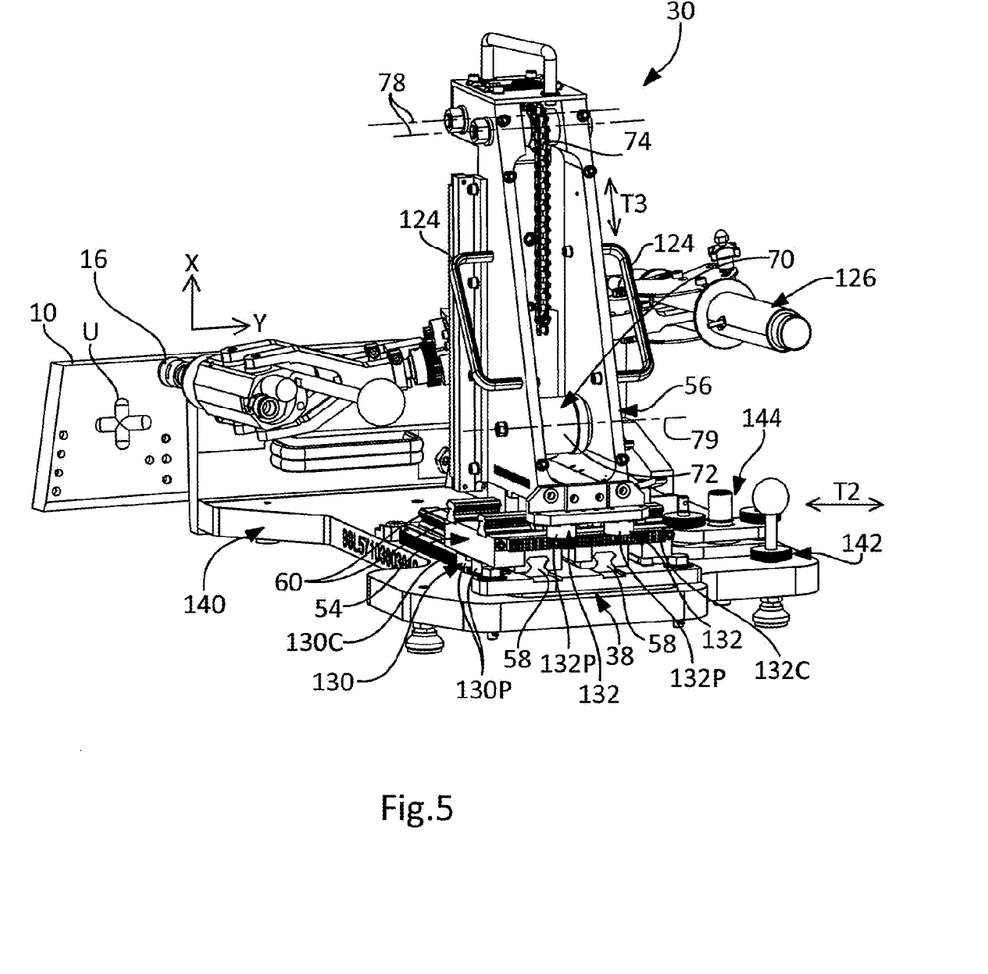
FIG. 5 is a perspective view from a first viewing angle of the machining device illustrated in FIG. 4.
Figure 6:
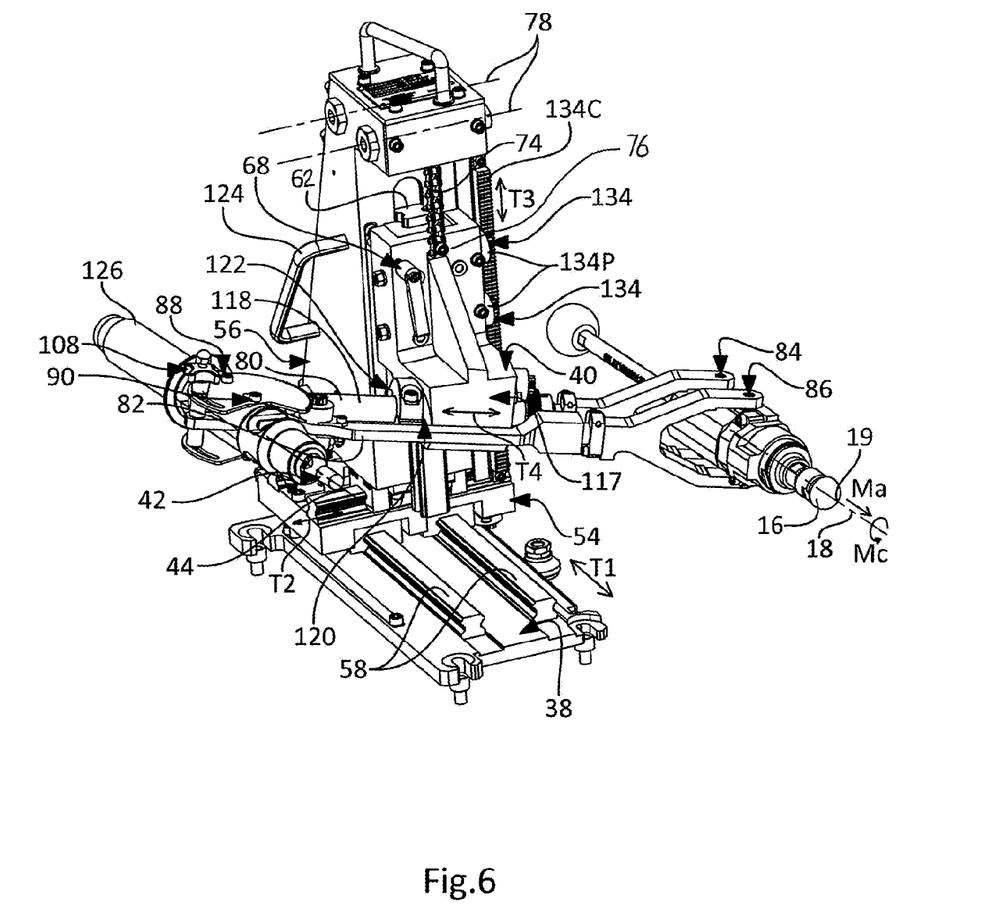
FIG. 6 is a perspective view from a second viewing angle of the tool support illustrated in FIG. 4.

As illustrated in FIGS. 5 and 6, the tool support comprises a first carriage 54 and a second carriage 56. The first carriage 54 can slide along at least one rail 58 (preferably two parallel rails) oriented in the direction T1 and securely attached to the fixed part 38. This first carriage 54 comprises at least one rail 60 (preferably two parallel rails) oriented in the direction T2, along which the second carriage 56 slides. This second carriage 56 comprises at least one rail 62 oriented in the direction T3, along which the moving part 40 slides.

Preferably, the tool support comprises a lock to immobilize the moving part 40 relative to the fixed part 38 in at least one direction.

Advantageously, a lock 64 (visible in FIG. 4) is provided to immobilize the translation of the first carriage 54 relative to the fixed part 38 in the direction T1.

Advantageously, a lock 66 (visible in FIG. 4) is provided to immobilize the translation of the second carriage 56 relative to the first carriage 54 in the direction T2.

Advantageously, a lock 68 (visible in FIG. 6) is provided to immobilize the translation of the moving part 40 relative to the second carriage 56 in the direction T3.

Preferably, an assister 70 is provided for favouring the translational movement of the moving part 40 in the direction T3 (which corresponds to the vertical) and compensating the weight of the moving part 40 and of the elements securely attached to the moving part 40. According to an embodiment that can be seen in FIGS. 5 and 6, the assister comprising a winder 72 suitable for exerting a pulling force on a cable or a chain 74 whose end 76 is linked to the moving part 40. This winder 72 is securely attached to the second carriage 56 which comprises, in a top part, at least one axis 78 (preferably two axes 78) over which the cable or the chain 74 passes. Thus, when the winder 72 exerts a pulling force on the cable or the chain 74, this provokes an upward movement of the moving part 40. According to one embodiment, the winder 72 takes the form of a metal blade which is spirally wound about a horizontal axis 79 at right angles to the direction T3.

The tool support comprises a first crossmember 80 and a second crossmember 82 that are parallel and spaced apart, two pivoting links 84 and 86 between the tool 16 and the first and second crossmembers 80 and 82 and two pivoting links 88 and 90 between the pointer 42 and the first and second crossmembers 80 and 82.

The pivoting links 84 to 90 comprise articulation axes, respectively A84 to A90 (visible in FIGS. 8 to 10), parallel to one another and which correspond to the vertices of a deformation parallelogram.

According to an embodiment illustrated in FIG. 10, the first crossmember 80 comprises, at a first end, a fork 92 with two branches 92.1 and 92.2. In parallel, the second crossmember 82 comprises, at a first end, a fork 94 with two branches 94.1 and 94.2.

Preferably, the tool support 30 comprises a sheath 96 in which the apparatus 20 supporting the tool 16 is immobilized. The sheath 96, arranged between the branches of each fork 92 and 94, is articulated on the articulation axis A84 relative to the ends of the branches 92.1 and 92.2 of the fork 92 and on the articulation axis A86 relative to the ends of the branches 94.1 and 94.2 of the fork 94. The sheath 96 is arranged relative to the first and second crossmembers 80 and 82 in such a way that the end 19 of the tool is spaced apart from the first crossmember 80. Preferably, the tool axis 18 is secant with the articulation axes A84 and A86. Advantageously, the tool axis 18 is at right angles to the articulation axes A84 and A86.

As an example, as illustrated in FIG. 10, the internal diameter of the sheath 96 is equal to the external diameter of the body 22 of the apparatus 20 and a collar 98 is provided to immobilize the translation of the apparatus 20 in the sheath 96.

Figure 7:
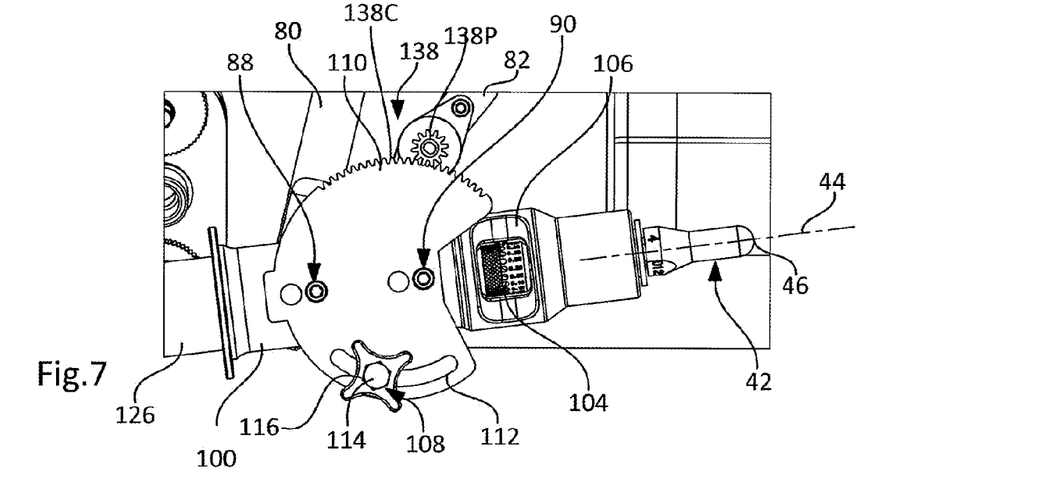
FIG. 7 is a plan view illustrating a pointer in detail.
Figure 8:
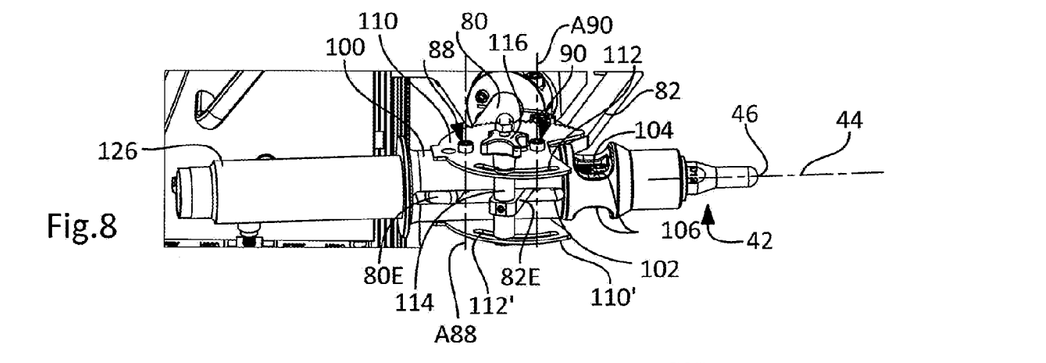
FIG. 8 is a side view of the pointer illustrated in FIG. 7.

Preferably, the tool support 30 comprises a body 100 supporting the pointer 42. According to an embodiment illustrated in detail in FIGS. 8 and 9, the body 100 has an approximately cylindrical form with an opening 102 in which are housed the ends 80E and 82E of the crossmembers 80 and 82, the articulation axes A88 and A90 passing through the body 100 and the ends 80E and 82E. As can be seen in FIG. 8, the second crossmember 82 passes through the body 100 via the opening 102 to extend on either side of the body 100. The body 100 is arranged relative to the first and second crossmembers 80 and 82 in such a way that its end is spaced apart from the first crossmember 80. Preferably, the pointer axis 44 is secant with the articulation axes A88 and A90. Advantageously, the pointer axis 44 is at right angles to the articulation axes A88 and A90.

Preferably, the pointer 42 is securely attached to the body 100 by a link which allows a translational movement along the pointer axis 44 to modify the position of the end 46 of the pointer relative to the body 100. According to one embodiment, the pointer 42 can slide in a bore formed in the body 100. The pointer 42 comprises a threaded portion which is screwed into a thumbwheel 104 (visible in FIG. 7) that is immobilized in translation relative to the body 100. The pointer 42 comprises structure (not visible) for immobilizing it in rotation relative to the body 100. Thus, the pivoting of the thumbwheel 104 on the pointer axis 44 provokes the translation of the pointer 42 along the pointer axis 44.

The body 100 comprises at least one window 106 for making the thumbwheel 104 accessible.

The fact that the tool axis 18 and/or the pointer axis 44 is/are at right angles to the articulation axes A84 to A90 makes it possible to obtain a more robust architecture compared to the prior art solutions.

According to one feature of the disclosure, the tool support 30 comprises an immobilizer 108 capable of occupying a first immobilized state in which it prevents a rotational movement on at least one articulation axis A84 to A90 and therefore the deformation of the deformable parallelogram and a second released state in which it allows rotational movement on the articulation axes A84 to A90 and therefore the deformation of the deformable parallelogram. In the immobilized state, the immobilizer 108 prevents the relative rotation of two sides on their common articulation axis. According to an embodiment illustrated in FIGS. 7 to 9, the body 100 supports at least one plate 110 and preferably two plates 110, 110' (in the form of disk portions) that are parallel to one another and at right angles to the articulation axes A88 and A90. These two plates 110, 110' arranged on either side of the body 100 are rigidly linked to the body 100 and are therefore perfectly immobile relative to the body 100. Each plate 110, 110' comprises an oblong opening 112, 112' with a curvilinear central portion centred relative to an articulation axis A90 of one of the two crossmembers 82. This same crossmember 82 supports a rod 114 parallel to the articulation axis A90. This rod 114 is immobile relative to the second crossmember 82 at least in a plane at right angles to the articulation axis A90. This rod 114 has a sufficient length and a suitable diameter for being housed in the two openings 112, 112'. This rod comprises, at a first end, a head (whose section is greater than the width of the openings 112, 112') and, at a second end, a threaded portion onto which a nut 116 is screwed (for example a star nut or a knurled nut).

Figure 9:
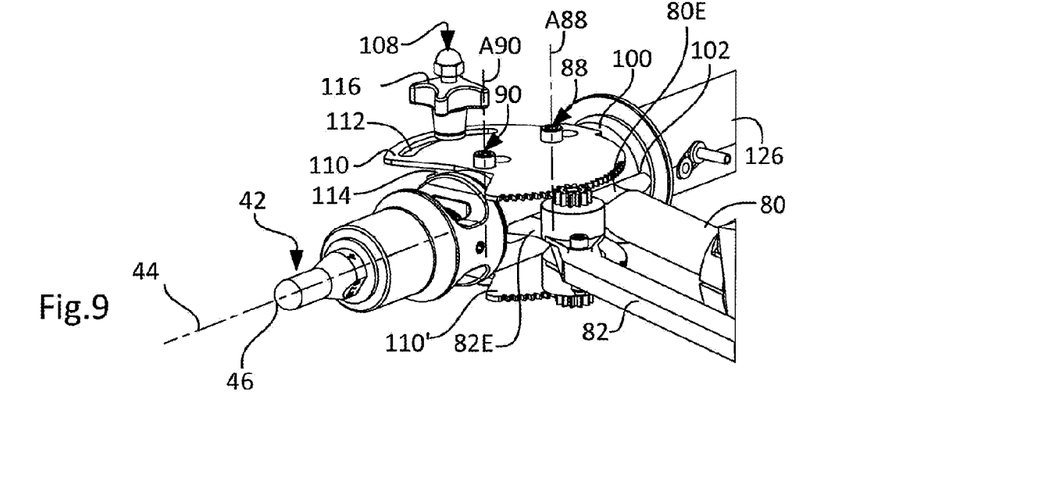
FIG. 9 is a perspective view of the pointer illustrated in FIG. 7.

To obtain the immobilized state, it is sufficient to screw the nut 116 until the two plates 110 and 110' are sufficiently clamped between the head and the nut of the rod 114.

To obtain the released state, it is sufficient to unscrew the nut 116 in such a way that the rod 114 can be displaced in the openings 112, 112'.

Obviously, the disclosure is not limited to this embodiment of the immobilizer 108. Thus, it would have been possible to provide a single plate 110 with an opening 112 in which the rod 114 can be displaced in the released state and a lock making it possible to immobilize the rod 114 relative to the plate 110.

According to one feature of the disclosure, the first crossmember 80 is linked to the moving part 40 in such a way as to extend on either side of the moving part 40. This configuration makes it possible to distribute the forces on either side of the moving part 40. Furthermore, it makes it possible to obtain a more rigid structure.

Figure 2:
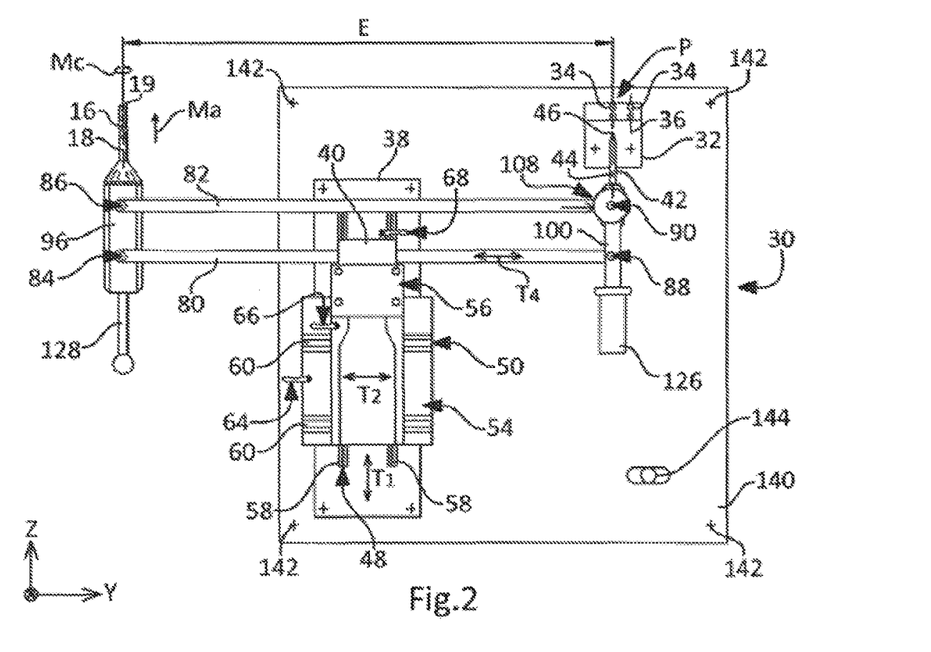
FIG. 2 is a plan view of a schematic representation of the machining device illustrated in FIG. 1 with a tool and a pointer.

According to a first variant illustrated in FIG. 2, the first crossmember 80 extends in a direction T4 approximately parallel to the direction T2.

According to another variant illustrated in FIGS. 4 to 6, the first crossmember 80 extends in a direction T4 which is not parallel to the direction T2.

The orientation of the direction T4 depends on the configuration of the machining area. Advantageously, the direction T4 is oriented in such a way that the end 19 of the tool is closer to the part 10 than the end 46 of the pointer 42.

According to another variant illustrated in FIGS. 4 to 6, the tool support comprises a link 117 between the first crossmember 80 and the moving part 40 which allows a rotational movement between the first crossmember 80 and the moving part 40. According to one embodiment, the first crossmember 80 comprises a cylindrical portion 118 with an axis parallel to the direction T4 and the moving part 40 comprises a sheath 120 in which the cylindrical portion 118 of the first crossmember 80 can pivot. This configuration makes it possible to obtain another degree of freedom, namely a rotation about a fourth direction T4.

Advantageously, a lock 122 is provided to immobilize the rotation of the first crossmember 80 relative to the moving part 40.

To improve the ergonomics, the second carriage 56 advantageously comprises two handles 124 arranged on either side of the second carriage 56.

For the same purpose, the body 100 of the pointer 42 comprises a handle 126 which extends in a direction opposite to the pointer 42. This handle 126 may comprise a control for controlling the cutting movement Mc of the tool 16.

In parallel, the sheath 96 comprises a handle 128 which extends in a direction opposite to the tool 16.

When machining, jerks or vibratory phenomena may occur on the tool 16 and tend to be propagated in the tool support 30 to the handles used by the operator to manipulate it. In order to remedy this discomfort, the tool support 30 comprises shock and/or vibration absorption means.

Preferably, at least one link of the tool support allowing a degree of freedom comprises a dampener for absorbing or damping shocks or vibrations.

Thus, the link between the fixed part 38 and the first carriage 54 comprises a shock absorber 130 that can be seen in FIG. 5. According to one embodiment, the fixed part 38 comprises a rack 130C on which at least one pinion 130P (preferably two pinions) can mesh, that is linked in a pivoting manner to the first carriage 54.

The link between the first carriage 54 and the second carriage 56 comprises a shock absorber 132 that can be seen in FIG. 5. According to one embodiment, the first carriage 54 comprises a rack 132C on which at least one pinion 132P (preferably two pinions) can mesh, that is linked in a pivoting manner to the second carriage 56.

The link between the second carriage 56 and the moving part 40 comprises a shock absorber 134 that can be seen in FIG. 6. According to one embodiment, the second carriage 56 comprises a rack 134C on which at least one pinion 134P (preferably two pinions) can mesh, that is linked in a pivoting manner to the moving part 40.

Figure 11:
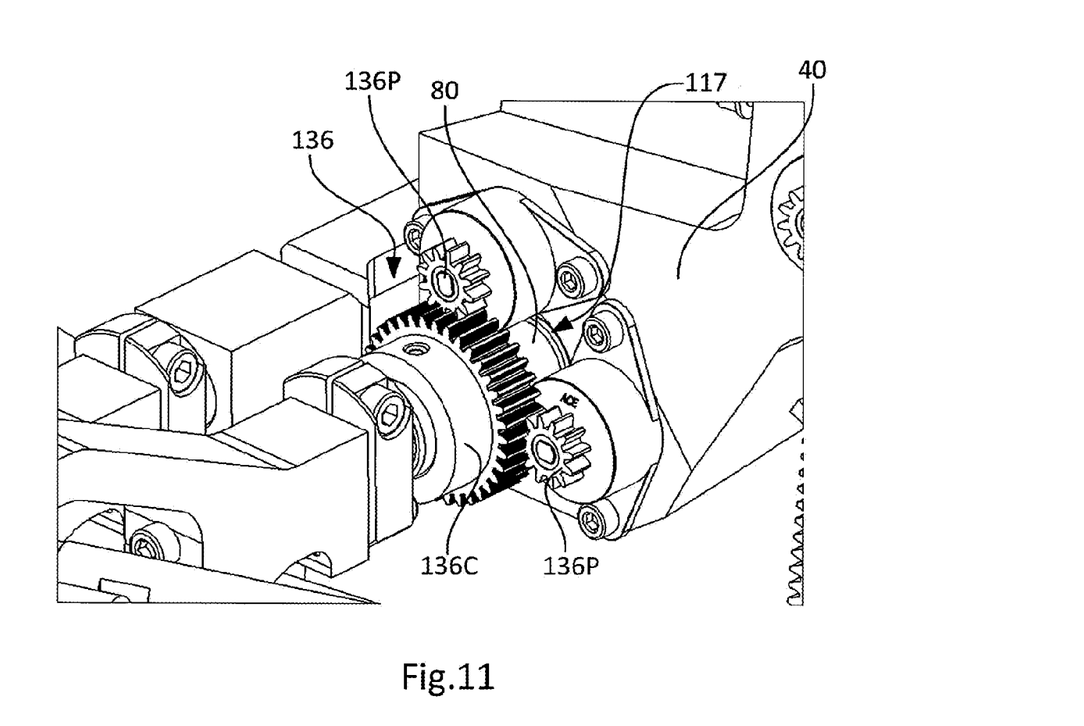
FIG. 11 is a perspective view illustrating in detail a link between a moving part and a crossmember equipped with a shock absorber.

The link between the moving part 40 and the first crossmember 80 comprises a shock absorber 136 that can be seen in FIG. 11. According to one embodiment, the first crossmember 80 comprises a serrated crown wheel 136C that is fixed relative to the first crossmember 80, on which at least one pinion 136P (preferably two pinions 136P) can mesh, that is linked in a pivoting manner to the moving part 40.

Finally, the tool support 30 comprises, between the second crossmember 82 and the body 100 of the pointer, a shock absorber 138 that can be seen in FIG. 7. According to one embodiment, the plate 110 comprises, at the periphery, a curved serrated portion 138C that is centred relative to the articulation axis A90 on which at least one pinion 138P can mesh, that is linked in a pivoting manner to the second crossmember 82.

Each pinion 130P to 138P is supported by an axis of which a portion supporting fins or protruding forms is immersed in a viscous or pasty fluid.

However, the disclosure is not limited to this embodiment. Thus, other solutions could be envisaged for absorbing or damping the vibrations or the shocks.

According to one feature of the disclosure, the machining device comprises a soleplate 140 on which the tool support 30 and the stencil P are fastened.

The tool support 30 is removably fastened onto the soleplate 140 by any appropriate means, such as, for example, by bolting. The fact that the soleplate 140 and the tool support 30 are dissociated facilitates the installation of the device in confined areas.

Preferably, the same applies to the stencil P. According to one embodiment, the stencil P comprises an L-shaped section of which a first wing is fixed removably to the soleplate 140 and of which the other wing comprises a form U' making it possible to perform the machining U in the part 10 by copying. However, the disclosure is not limited to this embodiment of the stencil P.

The soleplate 140 comprises structure 142 for securely attaching it to the part or to any immobile element in the reference frame XYZ of the part. Advantageously, a positioner 144 is provided to favor the positioning of the soleplate 140 in the reference frame XYZ of the part.

The soleplate 140 is positioned relative to the part 10 to be machined in such a way that the distance separating a point of the machining U of the part 10 and the corresponding point of the form U' of the stencil P is substantially equal to the distance E between the end 19 of the tool 16 and the end 46 of the pointer 42. In the case of a drill hole, the drilling template 32 is positioned relative to the part 10 to be drilled in such a way that a guiding axis 36 is positioned parallel to the axis 14 of the corresponding drill hole to be produced and separated from the axis 14 by a distance substantially equal to the distance E between the end 19 of the tool 16 and the end 46 of the pointer 42.

Furthermore, the soleplate 140 is positioned in such a way that the direction T1 is approximately merged with the first axis Z.

The principle of operation of the machining device is now described.

In the case of machining by copying, the tool support 30 and the stencil P are positioned and fixed in the reference frame XYZ of the part 10, notably by virtue of the soleplate 140.

All the locking systems 64 to 68 and 122 and the immobilizer 108 are in the unlocked or released state so that all the movements of the tool support are free. The operator then grasps the two handles 126 and 128. He or she then moves the pointer 42 relative to the stencil P so as to make it cover the entire form U'. In parallel, by virtue of the architecture of the tool support 30, the tool 16 machines the machining U in the part 10.

When he or she wants to produce at least one drill hole 12 with the same tool support, it is sufficient for the operator to initially align the pointer axis 44 with the direction T1, the latter being aligned with the axis 14 of the hole because of the positioning of the tool support 30 in the reference frame XYZ of the part. When the pointer axis 44 is aligned, the lock 122 and the immobilizer 108 are positioned in the locked state in order to retain the orientation of the pointer axis 44.

To position the pointer 42 correctly relative to the guiding hole 34, the operator uses the translations in the directions T2 and T3. When the pointer 42 is aligned with the guiding hole 34, the operator pushes the moving part 40 of the tool support by using the handles 124 in such a way as to provoke a translation in the direction T1. In this movement, the pointer 42 penetrates into the guiding hole 34 and the tool 16 produces the hole 12 in the part 10. To produce another drill hole, it is sufficient for the operator to position the pointer 44 relative to the guiding hole corresponding to the drill hole to be produced. When the pointer 44 is aligned with the guiding hole, the operator pushes the moving part 40 of the tool support by using the handles 124 in such a way as to provoke the translation in the direction T1. In this movement, the pointer 42 penetrates into the guiding hole 34 and the tool 16 produces the hole 12 in the part 10.

To obtain a multipurpose machining device suitable for machining shapes that are not very complex and for producing drill holes, the tool support comprises a fixed part 38, a moving part 40, a tool 16 linked by two articulation axes A84 and A86 to the two crossmembers 80 and 82, one of which is linked to the moving part 40, a pointer 44 linked to the crossmembers 80 and 82 via two articulation axes A88 and A90, the articulation axes A84 to A90 being parallel to one another and immobilizer 108 capable of immobilizing any rotational movement on at least one articulation axis. The moving part 40 can be displaced relative to a fixed part 38 (fixed relative to the reference frame XYZ linked to the part 10 to be machined) by describing more or less complex movements according to the advance movement of the tool 16. As an example, this movement can be a simple translation or a circular movement of the tool axis 18 about the axis of the drill hole to be produced. This configuration makes it possible to obtain a multipurpose tool support that can perform drilling and machining operations by copying.

Preferably, the tool support comprises a link linking the moving part 40 to the fixed part 38 which allows at least one translational movement in a first direction T1 at right angles to the articulation axes A84 to A90 in such a way that the first direction T1 is likely to be parallel to the tool axis 18, the tool axis 18 corresponding to the forward movement of the tool during a drilling operation.

Advantageously, the link linking the moving part 40 to the fixed part 38 allows at least one movement in a plane at right angles to the first direction T1.

To obtain a robust device, the tool axis 18 is secant, and preferably at right angles, with the articulation axes A84 and A86. Advantageously, the pointer axis 44 is secant, and preferably at right angles, with the articulation axes A88 and A90.

The invention claimed is:

1. A tool support comprising:
    a fixed part;
    a moving part that is movable relative to the fixed part;
    a first crossmember, which is linked to the moving part, and a second crossmember;
    a machining tool rotatable about a tool axis, the tool being linked to the first crossmember via a first pivoting link comprising a first articulation axis, and the tool being linked to the second crossmember via a second pivoting link comprising a second articulation axis; and a pointer having a longitudinal pointer axis parallel to the tool axis, the pointer being linked to the first crossmember via a third pivoting link comprising a third articulation axis, and the pointer being linked to the second crossmember via a fourth pivoting link comprising a fourth articulation axis, wherein the articulation axes are parallel to one another, and wherein the tool support comprises an immobilizer configured to occupy a first, immobilized, state in which the immobilizer prevents a rotational movement about at least one of the articulation axes and a second, released, state in which the immobilizer allows rotational movement about the at least one of the articulation axes.

2. The tool support according to claim 1, wherein the tool support comprises a link linking the moving part to the fixed part which allows at least one translational movement in a direction T1 at a right angle to at least one of the articulation axes.

3. The tool support according to claim 2, wherein the link linking the moving part to the fixed part allows at least one movement in a plane which is at a right angle to the direction T1.

4. The tool support according to claim 2, wherein the link linking the moving part to the fixed part comprises three slide links respectively allowing translational movements in three directions T1, T2, T3 at right angles to one another, the direction T3 corresponding to a vertical direction.

5. The tool support according to claim 4, comprising an assister for assisting the translational movement in the vertical direction T3 and compensating for weight of the moving part.

6. The tool support according to claim 1, wherein the tool axis is orthogonal to the respective articulation axes linking the tool and the first crossmember and the tool and the second crossmember.

7. The tool support according to claim 6, wherein the tool axis is at a right angle to the respective articulation axes linking the pointer and the first crossmember and the pointer and the second crossmember.

8. The tool support according to claim 1, wherein the pointer axis is orthogonal to the respective articulation axes linking the pointer and the first crossmember and the pointer and the second crossmember.

9. The tool support according to claim 8, wherein the pointer axis is at a right angle to the respective articulation axes linking the tool and the first crossmember and the tool and the second crossmember.

10. The tool support according to claim 1, comprising a link between the first crossmember and the moving part which allows a rotational movement between the first crossmember and the moving part.

11. The tool support according to claim 10, wherein the first crossmember comprises a cylindrical portion and the moving part comprises a sheath in which the cylindrical portion of the first crossmember can pivot.

12. The tool support according to claim 10, comprising a lock for immobilizing the rotational movement of the first crossmember relative to the moving part.

13. The tool support according to claim 1, wherein the first crossmember is linked to the moving part in such a way as to extend on both lateral sides of the moving part, and wherein the immobilizer comprises at least one portion configured such that the immobilizer is able to be tightened by one or more fingers of a user of the tool support in order to prevent rotational movement.

14. The tool support according claim 1, comprising a lock for immobilizing the moving part relative to the fixed part in at least one direction.

15. The tool support according to claim 1, wherein the tool support comprises a sheath, in which an apparatus supporting the tool is immobilized, the sheath being linked to the first and second crossmembers at the articulation axes of each respective pivoting link that links the tool to the first and second crossmembers.

16. The tool support according to claim 15, wherein the sheath comprises a handle which extends in an opposite direction from a direction of extension of the tool.

17. The tool support according to claim 1, wherein the tool support comprises a body linked to the first and second crossmembers at the articulation axes of each respective pivoting link that links the pointer to the first and second crossmembers, and wherein the body is linked to the pointer by a link which allows a translational movement along the pointer axis to modify the position of the end of the pointer relative to the body.

18. The tool support according to claim 1, wherein the tool support comprises a body linked to the first and second crossmembers at the articulation axes of each respective pivoting link that links the pointer to the first and second crossmembers, and wherein the body comprises a handle which extends in an opposite direction from a direction of extension of the pointer.

19. The tool support according to claim 1, wherein at least one of the pivoting links of the tool support allowing a degree of freedom comprises a dampener for absorbing or damping shocks or vibrations.

20. A machining device comprising a tool support according to claim 1.

21. The machining device according to claim 20, comprising a stencil with a form making it possible to perform a machining in a part by copying.

22. The machining device according to claim 21, comprising a soleplate, onto which the tool support and the stencil are fastened.

23. The machining device according to claim 20, wherein the tool support is configured to be removably fastened onto a soleplate.

* * * * *